United States Patent [19]

Stehouwer

[11] Patent Number: 4,578,139
[45] Date of Patent: Mar. 25, 1986

[54] TAG MANUFACTURING APPARATUS

[75] Inventor: William J. Stehouwer, Lansing, Mich.

[73] Assignee: A. J. Sparks & Company, Grand Rapids, Mich.

[21] Appl. No.: 576,438

[22] Filed: Feb. 2, 1984

[51] Int. Cl.⁴ ............................ B65C 7/00; B65C 9/10
[52] U.S. Cl. .................................... 156/384; 156/522; 156/572; 156/580.1; 156/583.1; 156/DIG. 23; 156/DIG. 29; 493/375
[58] Field of Search ................ 493/375; 156/384, 522, 156/572, 580.1, 583.1, DIG. 23, DIG. 29, 73.1, 521

[56] References Cited

U.S. PATENT DOCUMENTS

| 1,365,853 | 1/1921 | Roberts | 493/375 |
| 2,226,766 | 12/1940 | Gordon et al. | 156/522 |
| 2,601,005 | 6/1952 | Raney | 156/522 |
| 4,407,082 | 10/1983 | Stehouwer | 40/2 R |

Primary Examiner—Michael Wityshyn
Attorney, Agent, or Firm—Price, Heneveld, Huizenga & Cooper

[57] ABSTRACT

A tag assembling machine feeds tag bodies and tag ties from opposite directions along a lineal path into a centralized work station in predetermined alignment for assembly. In the preferred embodiment, the work station includes a welding apparatus for bonding the tag tie to the tag body.

21 Claims, 7 Drawing Figures

TAG MANUFACTURING APPARATUS

BACKGROUND OF THE INVENTION

The present invention relates to a machine for the manufacturing of tags, and particularly tags requiring welding, printing or other manufacturing processes.

Tags such as those used for nursery stock and of the type disclosed in U.S. Pat. No. 4,407,082 have been manufactured by a conveyor-type device in which a plurality of tags are placed in an array along a horizontally extending conveyor bed which transports the rows of tags over a plurality of vertically extending welding stations positioned above the conveyor. Wire for the tag tie was supplied from each side of the conveyor such that at least four tags could be welded simultaneously. The machinery employed for providing such tag manufacturing process which provided a maximum rate of approximately 1,900 tags per hour was extremely bulky, extending over a length of over eight feet and a width of approximately four feet. Although the machine provides a high quality weld of the tag tie to the tag body, the machine cost and size as well as its relatively slow speed were significant disadvantages.

SUMMARY OF THE PRESENT INVENTION

The system of the present invention overcomes the inefficiencies of the prior art welding apparatus by providing a tag assembling machine which efficiently feeds tag bodies into a centralized work station in a direction opposite from the tag ties or fastening means for assembly at the centralized location. The assembly or joining, in the preferred embodiment, comprises a welding apparatus centrally positioned within the machine and the relatively compact device can, with a single welding head, manufacture approximately 4,300 tags per hour by employing opposed lineal feed of tag bodies and tag ties.

Apparatus of the present invention includes means for supplying tag bodies into a work station along a lineal path from a first direction and means for selectively supplying tag fastening means along the lineal path from an opposite direction. The apparatus further includes means for securing the tie to the tag body while in alignment at the work station and for ejecting the assembled unit from the machine. In a preferred embodiment of the invention, the attaching means comprises an ultrasonic welding head for welding polymeric tag bodies and tag ties.

In a preferred embodiment of the invention, the lineal path leading from the work station in opposite directions to a supply of tag bodies and a supply of tag ties is inclined and is relatively short to provide a compact machine.

By providing the short, lineal, opposed feed of two objects to be bonded, in the preferred embodiment of the invention, a high speed apparatus is provided which is compact, highly efficient and relatively inexpensive. In addition, the apparatus of the present invention permits additional manufacturing processes such as printing to be applied to the tag body while it moves into the work station for welding.

These and other features, objects and advantages of the present invention will become apparent to those skilled in the art upon reading the following description thereof together with reference to the accompanying drawings in which:

DETAILED DESCRIPTION OF THE PREFERRED EMBODIMENT

Figure 1:
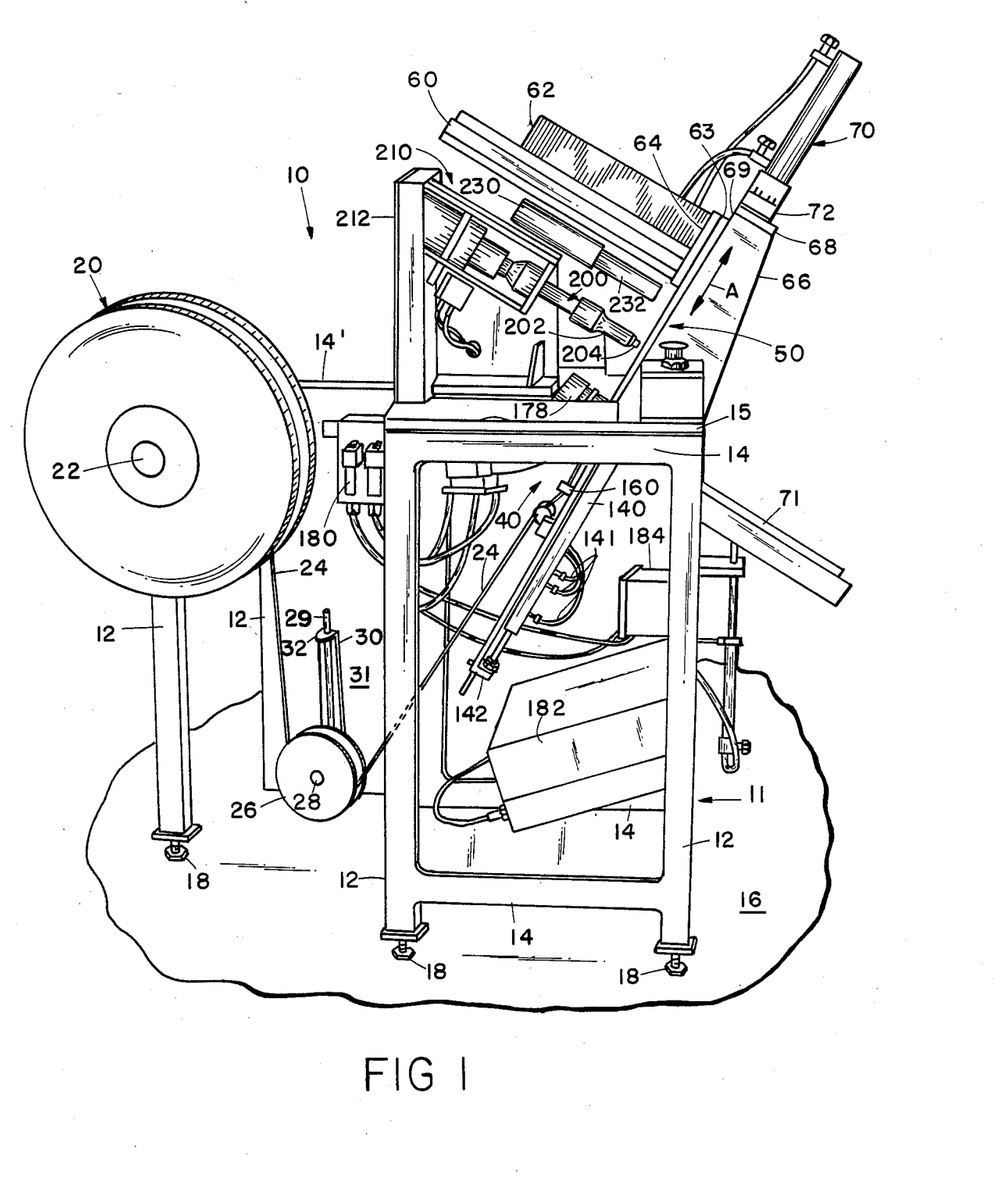
FIG. 1 is a left side elevational view of an apparatus embodying the present invention.

Referring initially to FIG. 1, there is shown a tag assembly machine 10 embodying the present invention and which includes a table-like, generally rectangular support frame 11 including a plurality of spaced, vertically extending, steel channel legs 12 joined by horizontally extending braces 14. Braces 14 are welded to legs 12 to define a stable structure for the machine which rests on a floor surface 16 and is leveled by suitable adjustable leveling feet 18 at the bottom of vertical legs 12. At the rear of the machine, a reel 20 defining, in part, tag tie supply means is rotatably mounted to the end of a horizontally extending arm 14' by means of an axle 22 and suitable locking means such as a removable locking key or the like (not shown). The reel 20 is a source of semi-rigid, continuous, wire-like tie supply material 24 of the type disclosed in the above identified patent, the disclosure of which is incorporated herein by reference. Material 24 is a polymeric material reinforced by a pair of spaced, flexible wires, integrally holded therein. The tie wire 24 extends downwardly and forwardly from reel 20 through a tensioning reel 26 on an L-shaped axle 28 mounted with its elongated, vertical leg 29 extending within a pair of vertically spaced collars 32 on a bracket 30 mounted to a sidewall panel 31 attached to frame 11. The weight of reel 26 thus maintains constant tension on wire 24 from reel 20. The tag tie material is then fed upwardly between the legs 12 of the frame into the tag tie wire advancement means 40, described in detail below in connection with FIGS. 4-6.

The rectilinear frame defined by legs 12 and cross members 14 defines an open topped table through which tie wire 24 extends in its travel from the supply reel 20 into a work station 50 positioned intermediate the supply of tie wire and a hopper 60 defining in part a tag body supply means for a plurality of relatively thin, planar polymeric tag bodies 62. The tag bodies 62 are, in the preferred embodiment, a relatively thin polymeric material such as a polyolefin and can be of any general shape, although in the embodiment shown, the tag body is cut in the shape of a leaf for use in identifying nursery stock. A plurality of tag bodies are stacked in a generally U-shaped, cross-sectional hopper having a floor 61

Figure 2:
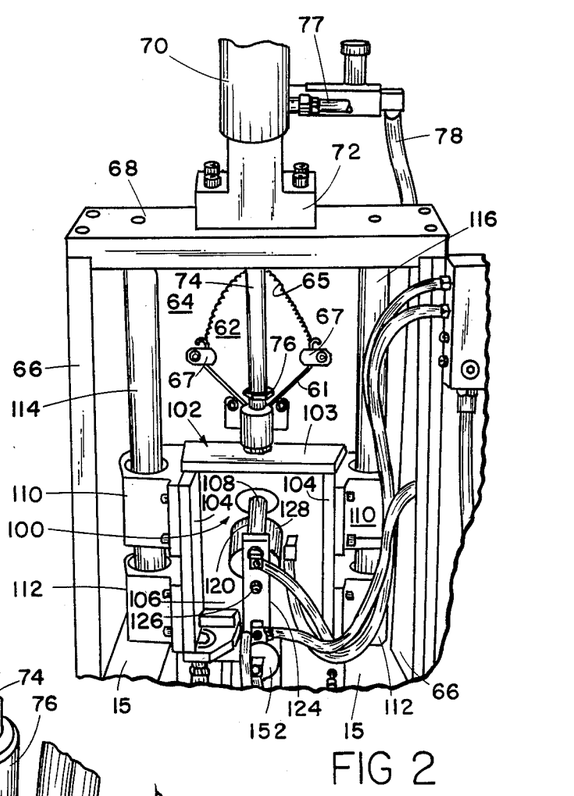
FIG. 2 is a fragmentary, front elevational view of the tag body carriage assembly incorporated in the apparatus of the present invention.
Figure 3:
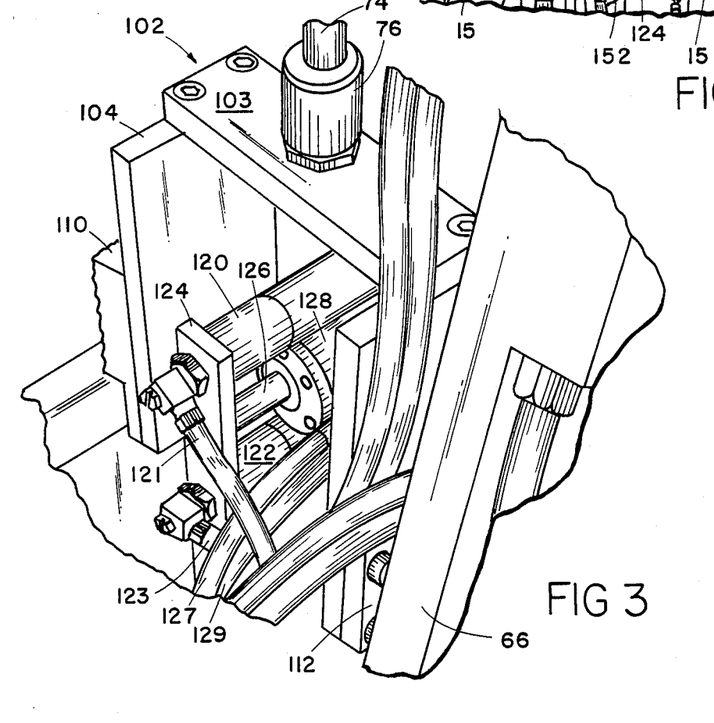
FIG. 3 is an enlarged, fragmentary, upper right perspective view of a portion of the apparatus shown in FIG. 2.

(FIGS. 2 and 6) for supporting the stack of tags. The floor is downwardly inclined from rear to front to assist the tags in advancement into position for removal from the hopper by the tag body transfer means 100, illustrated in FIGS. 2, 3 and 6. The tag hopper 60 is secured to a mounting plate 64, in turn mounted to a pair of spaced, inclined, trapizoidal-shaped frame members 66 by spacer blocks 63. Frame members 66 are welded or otherwise suitably attached to the top of the machine support frame 11. A horizontal upper cross member 68 extends between the tops of legs 66 and is secured thereto to provide support at an upper end of the structure and a base for the mounting of a pneumatically operated cylinder 70. Plate 64, on a side opposite hopper 60, includes, as best seen in FIG. 2, an opening 65 shaped substantially to the shape of the tag body such that the stack of tags can pass individually therethrough and be transferred by the tag body transfer means 100 from the hopper to the work station 50. In order to assist in singulating tag bodies from the hopper, they are releasably held by a pair of inwardly projecting leaf springs 67 (FIG. 2) which extend slightly within the open aperture 65 for holding the tag bodies in position at the open end of the hopper 60 and yet allow the outermost tag to be pulled out the plane of the drawing FIG. 2 past springs 67 for removal of single tag bodies from the supply hopper.

As best seen in FIG. 1, the trapizoidal support legs 66 define, along their rear edge 69, an inclined lineal path aligned with the infeed direction of continuous tie wire 24 and which extend in a lineal direction indicated generally by arrow A in FIG. 1. Thus, the supply of tie wire material 24 enters work station 50 along a direction indicated by arrow A from a lower rear position while the tag bodies 62 are fed from hopper 60 into the tag body transfer mechanism 100 for movement by such mechanism into the work station 50, also along the direction indicated by arrow A but from an opposite end of the machine as tie wire 24. Thus, with the opposed feed of tag bodies 62 and wire 24, the relatively short feed stroke, and by inclining the work station and tie wire supply and tag body supply, a relatively compact and efficient machine results.

The work station area includes a welding apparatus 200 and a tag printing apparatus 230 both of which are mounted to a generally rectangular frame 210, in turn secured to a vertical support member 212 integrally welded to the top of machine frame 11. As will be discussed in greater detail, in connection with FIGS. 4-6, the work station defined an area for the alignment of the tie wire with the tag body for welding of the two members in precise relationship. Once the welding step is achieved, as described in greater detail below, the assembled tags, illustrated in FIG. 7, are discharged from the machine by a discharge hopper 71 extending forwardly from the machine and having a tag receiving end positioned just under a cutting knife 170 (FIGS. 4 and 5) such that once the tag tie and tag body have been welded and the tag tie cut, the assembled tag will be discharged from the machine through chute 71.

Figures 4, 6, 7:
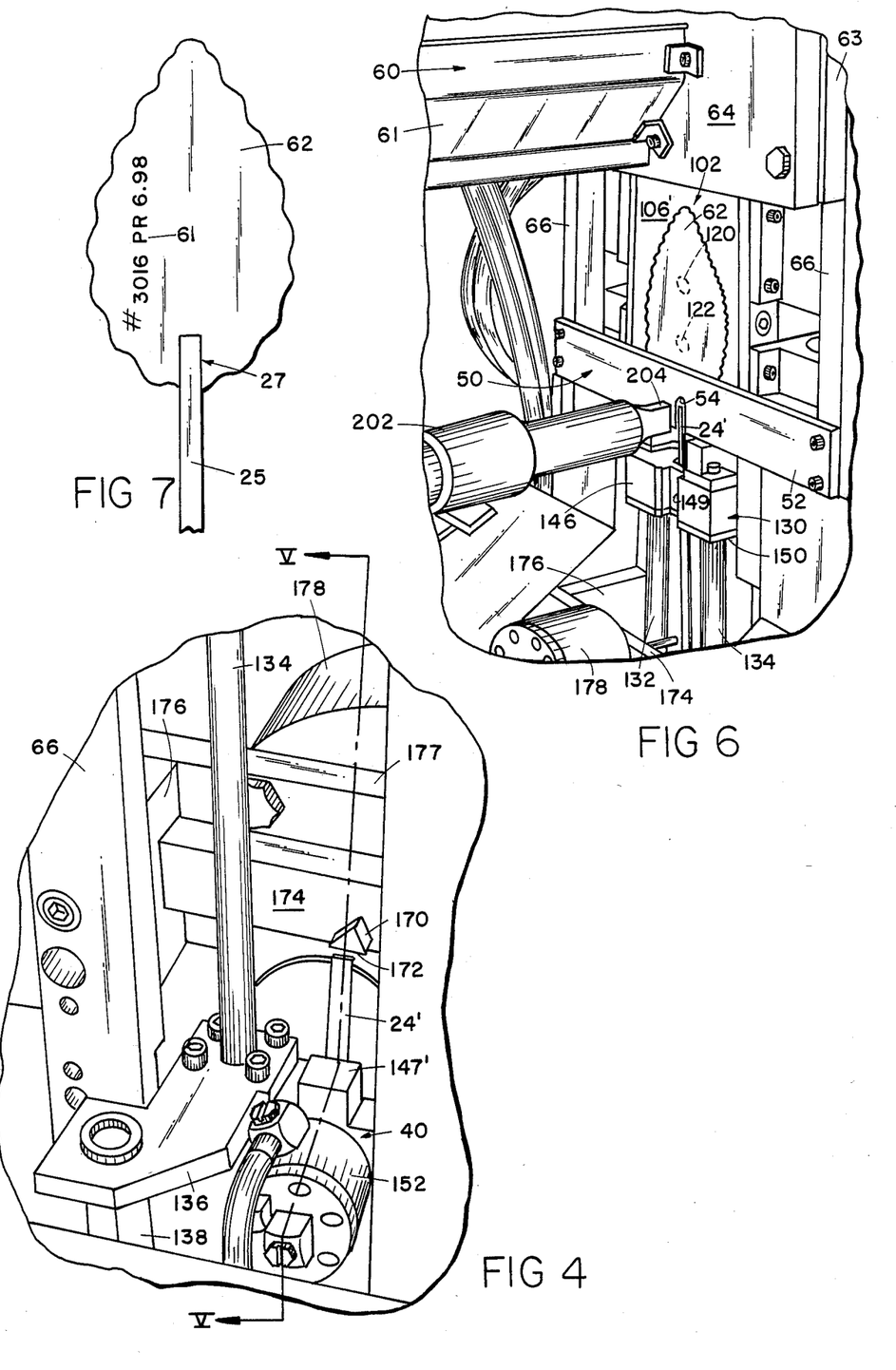
FIG. 4 is a front, right, fragmentary, perspective view of the tag tie advancing mechanism incorporated in the apparatus of the present invention and shown in a first position.
FIG. 6 is a fragmentary, left, rear perspective view of the work station in the apparatus of the present invention showing the tag tie advancing mechanism in a third position.
FIG. 7 is a plan view of a tag manufactured by the apparatus of the present invention.

The machine provides an assembled tag, as illustrated in FIG. 7, including the tag body 62 on which there may be printed indicia 61 applied to the tag body 62 as it travels from hopper 60 into the work station 50 by the jet printer 230. The tag also includes a tag tie 25 which is a cut segment of the continuous tag tie material 24. The tag tie 25 can be welded to the tag body 62 at their interface 27 in a pattern and ultrasonic energy level substantially the same as described in the above identified and referenced patent. Having briefly described the major elements of the machine and their relative location and function, a detailed description of the tag body transfer means 100 follows in conjunctin with FIGS. 2, 3 and 6. Subsequently, a detailed description of the tag tie advancement means and tie cutting means is provided.

The tag body transfer means 100 comprises a means for releasably holding a tag tie body as well as means for advancing and retracting the releasably body holding means toward the tag body hopper 60 and the work station. In the preferred embodiment of the invention, a generally rectangular carriage 102 is provided and moves along a lineal path between the hopper and work station to transfer the tag bodies. Carriage 102 includes a top wall 103, sidewalls 104 and a front wall 106. The front wall includes a pair of vertically spaced apertures 108 permitting vacuum suction cups to extend into and retract from the front plate 106 toward the endmost tag body 62, as illustrated in FIG. 2, when the carriage 102 is raised from its lowered position, shown in FIG. 2, to the uppermost tag body receiving position.

Carriage 102 includes a pair of sliding pillow block bocks 110 and 112 extending in vertically spaced relationship on the outer side of each of the sidewalls 104 and which surround and are slidably mounted to a pair of inclined guide rods 114 and 116. The upper ends of each of the rods 114 and 116 are secured to cross plate 68 while the lower ends are suitably mounted to horizontally extending plate 15 forming a partially open top for machine frame 11. Carriage 102 moves in an inclined direction corresponding to that of arrow A FIG. 1 in the lineal path along guide rods 114 and 116 and is moved between an upper tag body receiving position and a lower tag body holding position by means of cylinder 70 mounted to plate 68 by means of a mounting bracket 72. Cylinder 70 includes a shaft 74 extending through an aperture in plate 68 and coupled to top plate 103 of carriage 102 by means of a disconnectable coupling 76. Suitable pneumatic supply lines 77 and 78 are coupled to the double acting cylinder 70 for its actuation.

The releasable tag body holding means comprises a pair of commerically available, elongated, cylindrical vacuum cups 120 and 122 which are movably mounted to extend through apertures 108 in plate 106 for extending toward and in contact with the endmost tag 62 in the tag hopper and retract rearwardly to be flush with the forward face 106' of plate 106, as best seen in FIG. 6. The vacuum suction cups are mounted to a movable mounting plate 124 (FIG. 3) such that the two members are moved together in vertical alignment. Plate 124 is mounted to the shaft 126 of a pneumatically actuated pancake cylinder 128 which in turn has its cylindrical body mounted to the back side of plate 106. Actuation of cylinder 128 thereby causes plate 124 to move toward plate 106 thereby extending the vacuum cups 122 and 124 into a tag body gripping position extended from face 106' of plate 106 for removal of a tag body from hopper 60. The double acting cylinder 128, coupled to a pneumatic control source by lines 127 and 129, is then actuated to retract the vacuum cups 120 and 122 into a rearward position with the tag body 62 being held flush against surface 106' of the carriage 102, as illustrated in FIG. 6. A vacuum is applied to cylinders 120 and 122 by means of hoses 121 and 123 and a suitable source of reduced pressure which selectively releases the vacuum once the tag has been welded for discharge of the assembled tag into discharge 71. Thus, the tag holding vacuum cups 120 and 122 are selectively actuated to advance to grip a tag body from hopper 60, remove the tag from the hopper and hold it in position against plate 106 and continue holding the tag as the plate is moved from the upper tag receiving position to a lower work station alignment position, as shown in FIG. 6.

Figure 5:
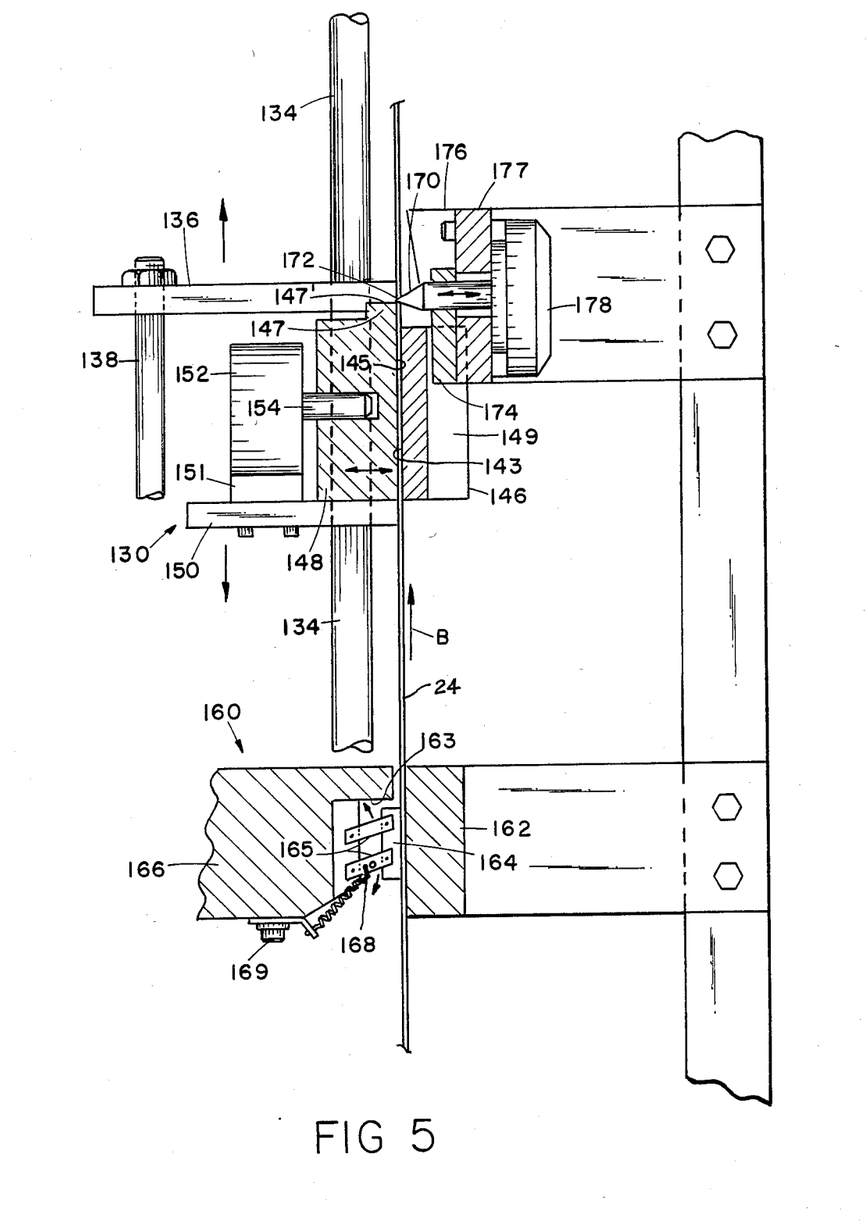
FIG. 5 is a vertical, cross-sectional view of the tag tie advancing mechanism shown in a second position and taken in a direction indicated by lines V—V in FIG. 4.

As the carriage 102 moves from its uppermost position to the lower work station position, the jet printer 230 is activated to provide printed indicia in the form of pricing information, etc. to the otherwise preprinted tag body. The jet printer can be, for example, a Model 9130 video coder/printer, manufactured by A B Dick of Elk Grove Village, Ill. The structure of such printer includes the printing head 230, mounted as shown in FIG. 1, and an associated microprocessor control system which can be remotely mounted to the side of the machine frame. While each tag body is being singulated from the hopper 60 and transported into the work station 50 in a predetermined aligned position by carriage 102, whose movement is precisely controlled, the tag tie wire is being advanced from supply 20 into the work station in precise alignment with the tag body from a direction opposite the movement of the tag body and in a lineal path. The tag tie advancing mechanism is best illustrated in FIGS. 4–6 and is now described.

The tie movement means 40 comprises a carriage or slide 130 which is movable along the lineal path indicated by arrow A on a pair of spaced guide rods 132 and 134, suitably anchored at opposite ends to the machine frame. Slide 130, like carriage 102, includes pillow block bearings to facilitate motion of the slide along rods 132 and 134. The slide is driven by means of a coupling plate 136 (FIGS. 4 and 5), mounted to the end of shaft 138 of a pneumatic cylinder 140 (FIG. 1), which in turn is mounted to the machine frame 11 by means of an L-shaped bracket 142. Thus selective actuation of cylinder 140 will cause slide 130 to move between three operative positions, illustrated in FIGS. 4–6.

The slide includes means for selectively clamping the tie wire 24 thereto and advancing the wire with upward movement of the slide such that it is advanced into the welding station, illustrated in FIG. 6, from the lowermost position, shown in FIG. 4.

The slide accordingly includes a laterally stationary clamping portion 146 which faces the rear of the machine and which includes a bevelled notch 149 therein permitting clearance for the slide 130 with respect to the mechanism for cutting the continuous tie wire supply into segments for each tag, as described below. The slide also includes a movable clamping block 148 having an upper section 147 defining a cutting block against which the die cutting element 170 operates to cut the wire 24, as illustrated in FIG. 5. Clamping block 148 moves along a guide track in support plate 150 to which backing plate 146 is fixedly mounted. Block 148 moves in a direction generally orthogonal to the movement of slide 130 on guide posts 132 and 134 to selectively clamp the wire 24 between the rearward facing surface 145 of clamp 148 and the forward facing surface 143 of backing plate 146. Clamp 148 is actuated by a pneumatically operated pancake cylinder 152, fixedly mounted to guide 150 by means of bracket 151. Cylinder 152 includes a shaft 154 conventionally coupled to the clamp 148 to allow clamping of the wire for movement of the wire and to release the wire such that the slide 130 can slip down the wire for subsequently clamping and advancing another section of wire.

Cylinder 140 is a three-position, double-acting cylinder supplied by suitable pneumatic supply lines 141, shown in FIG. 1, to position the carriage 130 and the wire held thereby in a lowermost position, illustrated in FIG. 4, a wire cutting position, illustrated in FIG. 5, and a welding position, illustrated in FIG. 6. In order to hold the supply of wire 24 from reel 20 from slipping while the clamping mechanism is released and slides down the upwardly extending wire 24, a clutch assembly 160, illustrated in FIG. 5, is employed.

Clutch 160 is positioned on bracket 142, as illustrated in FIG. 1, and includes a backing plate 162 and a movable clamping shoe 164 mounted to a support plate 166 by a pair of parallelogram arms 165. Shoe 164 is biased in a downward wire gripping position by means of a tension spring 168 anchored at one end of one of the legs 165 and at the opposite end to a fastening means such as an anchor bolt 169. The shoe 164 fits within an L-shaped notch 163 formed in housing 166 with the length of legs 165 selected with respect to member 162 such that the legs can pivot in a counterclockwise direction, as illustrated in FIG. 5, to allow slipage of the wire in an upward direction, indicated by arrow B in the Figure, and pivot downwardly into a wire gripping position in a clockwise position if the wire attempts to move in a direction opposite arrow B when the clamp mechanism releases the wire after advancement of the upper free end of the wire into the work station 50.

The tie wire is selectively cut by the cutter mechanism, illustrated in FIGS. 4–6 which includes a triangular die cutting element 170 having a cutting edge 172 thereon and which extends through a cross guide plate 174 in turn coupled to sidewalls 176 bolted to frame members 66. The knife or cutting element 170 is coupled to a knife actuating cylinder 178, also mounted to walls 176 by means of mounting plate 177. Cylinder 178 is selectively actuated to extend knife 170 through upwardly extending wire 24 and adjacent the upper cutting surface 147' of block 147 after the welding step such that the cutting action severs the wire as well as tends to push the lower portion of the assembled tag, illustrated in FIG. 7, outwardly and in a downward position for discharge from chute 71 (FIG. 1).

The work station 50 is an area intermediate the tag body supply means 60 and the tie wire advancement means 40 and in the preferred embodiment, comprises the location of the welding apparatus 200. The welding apparatus 200 includes an ultrasonic welding head 202 with a tip 204 configured to compress the end 74' of the tie against the tag body 62 and plate surface 106' to provide a plurality of spaced weld spots at area 27 (FIG. 7) between tie 25 and tag body 62 in a manner described in the above identified patent. The work station includes an alignment plate 52 having a notch 54 therein for guidably receiving the tip 24' of the supplied tie wire 24 which is advanced into a registered position illustrated in FIG. 6 by the clamp mechanism included with the carriage 130. For purposes of clarity, the printer 230 illustrated in FIG. 1 is not shown in FIG. 6, however, it is also located in the work station area 50 above cross member 52.

OPERATION

The tag bodies 62 are supplied in a generally downwardly direction from supply hopper 60 while the tie wire 24 is simultaneously moved into the work area in a stepwise fashion and cut. A cycle of operation can best be explained beginning with the cutting step which is the final stage of the proceeding cycle and one in which the knife 170, associated with the cutter, severs the wire 24, as shown in FIG. 5, subsequent to the printing and welding of an assembled tag and discharges the prior tag from chute 71. At this moment in time, the vacuum cups 120 and 122 have vacuum removed and are in a retracted position and the carriage 102 is in a lowered position, illustrated in FIG. 6. The clamping mechanism 130 is clamped and in an intermediate position at the cutting location of FIG. 5 which is below the work station but above the lowermost position, illustrated in FIG. 4.

Cylinder 70 is then actuated to raise the carriage 102 into a tag body receiving position. Simultaneously, cylinders 140 and 152 are actuated to release the wire clamping mechanism and lower slide 130 approximately ⅝ of an inch below the cutting position to the position shown in FIG. 4. This ⅝ of an inch corresponds to the overlap area 27 of the assembled tag such that the end 24' of the tag tie will extend, as illustrated in FIG. 4, above the clamp approximately ⅝ of an inch such that the stroke of the cylinder 140 in advancing the wire into the welding station in moving from the FIG. 4 position to the FIG. 6 position is constant and provides an automatic, precise overlap of the tag tie and body.

The sequence continues with the actuation of cylinder 128 to advance the vacuum cups 120 and 122 into a contacting position against endmost tag 62 of the supply hopper and the application of a vacuum to the cups for applying suction thereto. This is followed by the actuation of cylinder 128 to retract the tag from the hopper and onto the face of plate 106', as illustrated in FIG. 6. Cylinder 140 is then actuated at the same time as cylinder 70 such that the tie wire 24 is advanced into the work station by clamp mechanism 130 while the tag body 62 is lowered by carriage 102 into the work station position, as illustrated in FIG. 6. As the tag body traverses the print head 232 of the printer 230, printed indicia illustrated at 61 in FIG. 7 is jet printed thereon. At the end of the strokes of cylinders 70 and 140, the tag and tie wire are positioned in alignment with the end 24' of the tie wire being positioned within notch 54 of cross plate 52 and the lowermost end of the tag body being in an overlapping position in front of the wire.

At this point in time, shafts of cylinders 70 and 140 are held in a stationary holding position and the tip 204 of welding head 202 is advanced by the welding apparatus 200 to perform the ultrasonic bonding of the tie wire to the tag body. Subsequent to the retraction of the welding head 202, clamping carriage 130 is released by the actuation of clamp cylinder 152 and cylinder 140 actuated to lower the clamp into the cutting position, illustrated in FIG. 5. Cylinder 152 is then reactuated, clamping the wire and cutting cylinder 178 actuated to advance knife 170 through wire 24 just after the vacuum has been removed from vacuum cups 120 and 122 and carriage 102 is moved to an elevated position by the actuation of cylinder 70. The forward momentum of knife 170 tends, therefore, to kick the lower end of the assembled tag downwardly and outwardly into the open mouth of chute 71 for discharge of the assembled tag from the machine. The cycle is then repeated for the assembly of the next tag in the sequence.

The construction of the control system to provide the sequential control of the pneumatic valves and the welding head is conventional. The control is provided by a bank of electrically controlled, pneumatic valves 180 (FIG. 1) controlled through a microprocessor control circuit 182 mounted within the machine frame 11. Suitable sensors such as limit switches adjustably mounted between the frame and movable elements sense the various positions of the carriage and slide and provide control signals to circuit 182 which in turn controls the pneumatically operated valves 180 coupled to suitable supplies of pressure or vacuum 184 also mounted to the machine frame.

It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A machine for attaching tag ties to the bodies of tabs comprising:
   a machine frame;
   means at a first position on said machine frame for holding a supply of tag bodies;
   first means on said frame for moving individual tag bodies from said holding means at said first position to a second position on said machine frame;
   tag tie supplying means and means on said frame for moving tag ties from a third position on said machine frame to said second position and in alignment with a tag body; and
   means for securing a tag tie to a tag body at said second position, wherein said first, second and third positions lie substantially in a line and wherein said second position is located between said first and third positions such that tab bodies and tag ties are moved toward each other from opposite directions.

2. The apparatus as defined in claim 1 wherein said holding means includes a tag body supply hopper mounted on said frame for holding a plurality of tag bodies and wherein said first means includes carriage means with means for removing an individual tag body from said hopper when in said first position and for holding the tag body as said carriage means moves to said second position.

3. The apparatus as defined in claim 2 wherein said tag tie supplying means includes a reel of continuous tag tie stock mounted to said frame and wherein said moving means includes slide means including means for selectively gripping said tie stock and advancing an end of said stock from said third position to said second position.

4. The apparatus as defined in claim 3 and further including cutting means mounted to said frame for cutting the tag tie stock to a predetermined length to form a tag tie.

5. The apparatus as defined in claim 1 wherein said securing means comprises a welding apparatus.

6. The apparatus as defined in claim 1 and further including printing means positioned to print indicia on a tag body as it moves from said first to second position.

7. A machine for welding a tie to a tag body comprising:
   a machine frame having a work station at which a tag tie is welded to a tag body;
   a supply hopper mounted to said frame for holding a supply of tag bodies;

first means movably positioned on said frame to remove tag bodies from said hopper and sequentially move individual tag bodies to said work station in a predetermined position;

tag tie supply means;

second means movably positioned on said frame to receive a tag tie from said tag tie supply means and move the tag tie into alignment with the tag body at said work station; and welding means movably positioned on said frame to weld a tag tie to a tag body at said work station, wherein said first, second and welding means lie substantially in a line and wherein said welding means is located between said first and second means such that tag bodies and tag ties are moved toward each other from opposite directions.

8. The apparatus as defined in claim 7 wherein said first means includes means for releasably holding a tag body and means for advancing and retracting said holding means toward and away from said hopper to singulate tag bodies therefrom.

9. The apparatus as defined in claim 8 wherein said first means further includes a tag body carriage to which said holding means and said advancing and retracting means are mounted, and means movably mounted said carriage to said frame for controlled movement between said hopper and said work station.

10. The apparatus as defined in claim 7 and further including printing means mounted at said work station for applying printed indicia on a tag body as it travels from said hopper toward said work station.

11. A machine for welding a tie to a tag body comprising:

a machine frame having a work station at which a tag tie is welded to a tag body;

a supply hopper mounted to said frame for holding a supply of tag bodies;

first means movably positioned on said frame to remove tag bodies from said hopper and sequentially move individual tag bodies to said work station in a predetermined position wherein said first means includes means for releasably holding a tag body and means for advancing and retracting said holding means toward and away from said hopper to singulate tag bodies therefrom and wherein said first means further includes a tag body carriage to which said holding means and said advancing and retracting means are mounted, and means movably mounting said carriage to said frame for controlled movement between said hopper and said work station;

tag tie supply means;

second means movably positioned on said frame to receive a tag tie from said tag tie supply means and move the tag tie into alignment with the tag body at said work station, wherein said second means includes a slide movably mounted to said frame to travel between said work station and a position remote from said work station and toward said tag tie supply means, and clamp means mounted to said slide for selectively clamping a continuous supply of tag tie material for the stepwise advancement of tag tie material into said work station; and welding means movably positioned on said frame to weld a tag tie to a tag body at said work station.

12. The apparatus as defined in claim 11 and further including cutting means mounted to said frame and positioned to cut tag tie material to a predetermined length after said material is aligned with a tag body.

13. The apparatus as defined in claim 12 and further including slip clutch means mounted to said frame and through which the tag tie material passes and can move only in a direction toward said work station.

14. A machine for attaching semi-rigid tag ties from a continuous supply of wire-like stock to relatively thin planar tag bodies comprising:

a work station including means for securing a tag tie to a tag body;

tag body supply means for singulating tag bodies from a stack of tag bodies and transferring singulated tag bodies into said work station; and tag tie supply means for sequentially stepwise advancing wire-like tag tie material into said work station in alignment with a tag body and in synchronism with the supply of tag bodies and for cutting the tie material to a predetermined length, wherein said work station is positioned intermediate said body supply means and said tie supply means and wherein said body supply means, said work station and said tie supply means lie substantially in a line.

15. The apparatus as defined in claim 14 wherein said body supply means, said work station and said tie supply means lie in a line substantially inclined from horizontal.

16. The apparatus as defined in claim 15 and further including hopper means for holding a stack of tag bodies.

17. The apparatus as defined in claim 16 wherein said body supply means includes means for releasably holding a tag body and means for advancing and retracting said holding means toward and away from said hopper to singulate tag bodies therefrom.

18. The apparatus as defined in claim 17 wherein said body supply means further includes a tab body carriage to which said holding means and said advancing and retracting means are mounted, and means movably mounting said carriage for movement between said hopper and said work station.

19. The apparatus as defined in claim 18 wherein said tie supply means includes a slide movably mounted to travel between said work station and a position remote from said work station and toward said tag tie supply means, and clamp means mounted to said slide for selectively clamping a continuous supply of tag tie material for the stepwise advancement of tag tie material into said work station.

20. The apparatus as defined in claim 19 and further including slip clutch means through which the tag tie material passes and can move only in a direction toward said work station.

21. The apparatus as defined in claim 14 and further including printing means mounted at said work station for applying printed indicia on a tag body as it travels from said hopper toward said work station.

* * * * *

UNITED STATES PATENT AND TRADEMARK OFFICE
CERTIFICATE OF CORRECTION

PATENT NO. : 4,578,139

DATED : March 25, 1986

INVENTOR(S) : William J. Stehouwer

It is certified that error appears in the above-identified patent and that said Letters Patent is hereby corrected as shown below:

Column 3, lines 7 and 28:
"trapizoidal" should be --trapezoidal--;

Column 3, line 50:
"defined" should be --defines--;

Column 4, line 11:
"releasably" should be --releasable--;

Column 4, line 24:
"block" should be --blocks--;

Column 4, line 25:
delete "bocks";

Column 5, line 29:
"movement" should be --advancement--;

Column 6, line 24:
"slipage" should be --slippage--;

Column 6, line 60:
"with" should be --within--;

Column 8, line 35, claim 1:
"tab" should be --tag--;

UNITED STATES PATENT AND TRADEMARK OFFICE
CERTIFICATE OF CORRECTION

PATENT NO. : 4,578,139

DATED : March 25, 1986

INVENTOR(S) : William J. Stehouwer

It is certified that error appears in the above-identified patent and that said Letters Patent is hereby corrected as shown below:

```
Column 9, line 26, claim 9:
     "mounted" should be --mounting--;
Column 10, line 42, claim 18:
     "tab" should be --tag--.
```

Signed and Sealed this

Eleventh Day of November, 1986

Attest:

DONALD J. QUIGG

Attesting Officer

Commissioner of Patents and Trademarks